(12) United States Patent
Depondt (10) Patent No.: US 10,933,843 B2
(45) Date of Patent: Mar. 2, 2021

(54) WIPER DEVICE

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 15/775,672

(22) PCT Filed: Oct. 20, 2016

(86) PCT No.: PCT/EP2016/075253
§ 371 (c)(1),
(2) Date: May 11, 2018

(87) PCT Pub. No.: WO2017/080783
PCT Pub. Date: May 18, 2017

(65) Prior Publication Data
US 2018/0345915 A1 Dec. 6, 2018

(30) Foreign Application Priority Data
Nov. 11, 2015 (DE) ..................... 10 2015 222 156.3

(51) Int. Cl.
*B60S 1/40* (2006.01)
(52) U.S. Cl.
CPC ........... *B60S 1/4003* (2013.01); *B60S 1/4048* (2013.01); *B60S 2001/4051* (2013.01); *B60S 2001/4054* (2013.01)
(58) Field of Classification Search
CPC .... B60S 1/4003; B60S 1/4038; B60S 1/4045; B60S 1/4048; B60S 2001/4051; B60S 2001/4054

USPC ...................................................... 15/250.32
See application file for complete search history.

(56) References Cited

U.S. PATENT DOCUMENTS

| 2012/0047673 A1* | 3/2012 | Depondt ................. B60S 1/387 |
| | | 15/250.32 |
| 2014/0259504 A1* | 9/2014 | Piotrowski ............ B60S 1/4003 |
| | | 15/250.32 |
| 2015/0166017 A1 | 6/2015 | Young, III et al. |

(Continued)

FOREIGN PATENT DOCUMENTS

| CN | 1863698 A | 11/2006 |
| CN | 103459212 A | 12/2013 |

(Continued)

OTHER PUBLICATIONS

International Search Report for Application No. PCT/EP2016/075253 dated Jan. 17, 2017 (English Translation, 2 pages).

*Primary Examiner* — Gary K. Graham
(74) *Attorney, Agent, or Firm* — Michael Best & Friedrich LLP (57) ABSTRACT

The invention relates to a wiper device comprising a wiper blade adapter (10), which comprises at least one coupling unit (12) provided to produce a connection with at least two different wiper arm adapters (14, 16, 18, 20, 22), and at least one external unit (24) and at least one internal unit (26) which is at least partially embraced by the outer unit (24), which jointly delimit at least partially a receiving space (28) for the wiper arm adapters (14, 16, 18, 20, 22) and which are arranged at least substantially immovably relative to one another.

10 Claims, 10 Drawing Sheets

(56) References Cited

U.S. PATENT DOCUMENTS

| | | | | |
|---|---|---|---|---|
| 2015/0274133 A1* | 10/2015 | Polocoser | ............ | B60S 1/4045 |
| | | | | 15/250.32 |
| 2015/0329087 A1* | 11/2015 | Young, III | ............. | B60S 1/381 |
| | | | | 15/250.201 |
| 2016/0016554 A1* | 1/2016 | Depondt | ............... | B60S 1/4064 |
| | | | | 15/250.32 |
| 2016/0107616 A1* | 4/2016 | Young, III | ............ | B60S 1/4003 |
| | | | | 15/250.33 |

FOREIGN PATENT DOCUMENTS

| | | | |
|---|---|---|---|
| CN | 103476647 | A | 12/2013 |
| CN | 104890638 | A | 9/2015 |
| DE | 102009002764 | | 11/2010 |
| DE | 102011079783 | | 1/2013 |
| WO | 2015084764 | A1 | 6/2015 |

\* cited by examiner

Fig. 6e ated at least
WIPER DEVICE

BACKGROUND OF THE INVENTION

A wiper device which has a wiper-blade adapter comprising at least one coupling unit, which is provided to establish a connection to at least two different wiper-arm adapters, has already been proposed.

SUMMARY OF THE INVENTION

The invention proposes a wiper device having at least one wiper-blade adapter comprising at least one coupling unit, which is provided to establish a connection to at least two, in particular at least three, preferably at least four, preferably at least five and particularly preferably precisely five, different wiper-arm adapters and in particular in a fitted state, preferably optionally, to establish a connection to a single one of the different wiper-arm adapters at the same time and which has at least one outer unit and at least one inner unit, around which the outer unit engages at least to some extent, preferably to at least a great extent, said outer unit and inner unit together delimiting at least to some extent, preferably to at least a great extent, an accommodating space for accommodating the wiper-arm adapters and being arranged at least essentially in an immovable manner relative to one another, advantageously on one another. This can result in improved efficiency, in particular component-related efficiency and cost efficiency. By means of the wiper device, it is possible for optionally different wiper-arm adapters, in particular wiper-arm adapters of different constructions, to be fastened in a stable manner on the same wiper-blade adapter. This advantageously makes it possible to do away with further components, for example adapters, for fastening the different wiper-arm adapters. In addition, the level of user-friendliness can be increased since a user can couple the same wiper-blade adapter advantageously to different wiper-arm adapters.

A "wiper-blade adapter" in this context is intended to mean, in particular, an adapter which has at least one region of contact with at least one wiper-blade component and is connected to the wiper-blade component advantageously in captive fashion and, in particular, is provided so as to give at least one coupling region, which comprises, in particular, at least to some extent the coupling unit and preferably at least to some extent the accommodating space, in particular for coupling to, and/or establishing contact with, the wiper-arm adapter. "Provided" is intended to mean, in particular, specifically programmed, designed and/or equipped. That an object is provided for a specific function is intended to mean, in particular, that the object performs and/or executes this specific function in at least one use state and/or operating state. The expression "to at least a great extent" is intended to mean, in particular, at least 55%, advantageously at least 65%, preferably at least 75%, particularly preferably at least 80% and particularly advantageously at least 95%. "Coupling" in this context is intended to mean, in particular, a force-fitting and/or form-fitting connection, wherein advantageously a retaining force is transmitted between at least two components, preferably by a geometrical engagement of the components one inside the other and/or a frictional force between the components, this preferably being provided to be separated in a releasable, preferably non-destructive and particularly preferably tool-free manner. A "coupling unit" in this context is intended to mean, in particular, a unit which is provided to couple and/or to connect at least two components to one another, to be precise preferably a wiper-blade adapter optionally to one of the different wiper-arm adapters. An "outer unit" in this context is intended to mean, in particular, a unit which, in a fitted state, engages at least to some extent around the different wiper-arm adapters and has an outer surface which, in the fitted state, is at least essentially visible at least to a great extent. "At least essentially visible" in this context is intended to mean, in particular, visible at a glance. That "an object engages at least to some extent around a further object" is intended to mean, in particular, that there is at least one straight line which, advantageously in direct succession, passes through the object, then the further object and, after that, the object again, and that in particular at least part, in particular at least a large part, of a surface, in particular of a boundary surface and/or contact surface, of the object is surrounded by the further object, preferably a surface, in particular a boundary surface and/or contact surface, of the further object, and is preferably adjacent to the further object and particularly preferably is in contact with the further object. An "inner unit" in this context is intended to mean, in particular, a unit which, in a fitted state, has a wiper arm, in particular a wiper-arm adapter, engaging around it at least to some extent and which preferably in the fitted state, in particular as seen in plan view, is concealed to at least a great extent, preferably fully. The accommodating space is, in particular, an interspace between the outer unit and the inner unit. That "an object is delimited at least to some extent by a further object" is intended to mean, in particular, that two, preferably three, mutually perpendicular half-lines of which the common source is located within the object pass through the further object. That the outer unit and the inner unit are arranged in an immovable manner in relation to one another is intended to mean, in particular, that, in a fitted state, they are always spaced apart from one another by an at least essentially constant distance, which can be altered in particular at most by 1.00%, preferably at most by 0.10% and particularly preferably at most by 0.01%. Two objects which are arranged in an immovable manner in relation to one another can be moved in particular non-elastically in relation to one another.

A "wiper-arm adapter" in this context is intended to mean, in particular, an adapter which has at least one region of contact with at least one wiper-arm component and is connected to the wiper-arm component advantageously in captive fashion and, in particular, is provided to give a coupling region of the wiper-arm component, in particular for coupling to, and/or establishing contact with, the wiper-blade adapter. "Different wiper-arm adapters" is intended to mean, in particular, wiper-arm adapters of different types which differ preferably at least to some extent in terms of their construction and/or of their fastening function. The wiper-arm adapters are preferably different standard wiper-arm adapters. The wiper-arm adapters are particularly preferably top lock adapters. As an alternative, or in addition, the different wiper-arm adapters could be side lock adapters. The different wiper-arm adapters are advantageously wiper-arm adapters from a group of wiper-arm adapters which comprises, in particular, a plurality of wiper-arm adapters, to be precise in particular at least one RB-TL2 wiper-arm adapter, at least one RB-TL2.2 wiper-arm adapter, at least one RB-TL2.1 wiper-arm adapter, at least one VA-TL2 wiper-arm adapter and/or at least one VA-TL2.1 wiper-arm adapter. The different types are, in particular, wiper-arm adapters which comprise at least one main body and have, in particular, a main wall and two side walls arranged on the main wall, wherein advantageously the main wall and the side walls together form the main body at least to some extent, preferably to at least a great extent and particularly preferably fully. The side walls are arranged at least essentially perpendicularly on the main wall and are connected thereto in one piece. The expression "at least essentially perpendicularly" here is intended to define, in particular, an orientation of a direction relative to a reference direction, wherein the direction and the reference direction, in particular as seen in a single plane, enclose an angle of 90°, the angle having, in particular, a maximum deviation of, in particular, smaller than 8°, advantageously smaller than 5° and particularly advantageously smaller than 2°.

"A first type of wiper-arm adapter" in this context is intended to mean, in particular, a wiper-arm adapter, advantageously an RB-TL2 wiper-arm adapter, which, in particular as seen in plan view, has an at least essentially s-shaped main body. The wiper-arm adapter comprises, in particular, at least one fastening aperture, which is advantageously arranged in the main wall. The wiper-arm adapter preferably has at least one fastening means for each side wall, the fastening means being arranged on the respective side walls and advantageously being connected thereto in one piece.

"A second type of wiper-arm adapter" in this context is intended to mean, in particular, a wiper-arm adapter, advantageously an RB-TL2.2 wiper-arm adapter, which, in particular as seen in plan view, has an at least essentially s-shaped main body. The wiper-arm adapter comprises, in particular, at least one fastening aperture, which is advantageously arranged in the main wall. The wiper-arm adapter preferably has at least two fastening means for each side wall, the fastening means being arranged on the respective side walls and advantageously being connected thereto in one piece.

"A third type of wiper-arm adapter" in this context is intended to mean, in particular, a wiper-arm adapter, advantageously an RB-TL2.1 wiper-arm adapter, which, in particular as seen in plan view, has an at least essentially I-shaped main body. The wiper-arm adapter comprises, in particular, at least one fastening aperture, which is advantageously arranged in the main wall. The wiper-arm adapter preferably has at least two fastening means for each side wall, the fastening means being arranged on the respective side walls and advantageously being connected thereto in one piece.

"A fourth type of wiper-arm adapter" in this context is intended to mean, in particular, a wiper-arm adapter, advantageously a VA-TL2 wiper-arm adapter, which, in particular as seen in plan view, has an at least essentially I-shaped main body. The wiper-arm adapter comprises, in particular, a fastening nose, which is advantageously arranged at a free end of the wiper-arm adapter and is preferably designed in the form of an extension of the main wall. The wiper-arm adapter comprises, in particular for each side wall, at least one backstop, which is arranged on the respective side wall and is advantageously connected thereto in one piece.

"A fifth type of wiper-arm adapter" in this context is intended to mean, in particular, a wiper-arm adapter, advantageously a VA-TL2.1 wiper-arm adapter, which, in particular as seen in plan view, has an at least essentially I-shaped main body. The wiper-arm adapter comprises, in particular, a fastening nose, which is advantageously arranged at a free end of the wiper-arm adapter and is preferably designed in the form of an extension of the main wall. The wiper-arm adapter comprises, in particular for each side wall, at least one backstop, which is arranged on the respective side wall and is advantageously connected thereto in one piece. The wiper-arm adapter comprises, in particular, at least one fastening aperture, which is advantageously arranged in the main wall. The wiper-arm adapter also comprises a further fastening nose, which projects, in particular, at least to some extent into the fastening aperture and is advantageously designed in the form of an extension of the main wall.

It is conceivable for there to be further types of wiper-arm adapter, which may have, in particular, the features of the aforementioned types advantageously in combination and in any desired number regarded as being expedient by a person skilled in the art. As an alternative, or in addition, it is advantageously also possible for such wiper-arm adapters to be coupled advantageously to the wiper-blade adapter.

That an object is "at least essentially in the form of a reference object" is intended to mean, in particular, that a shape, and in particular a volume, of the object deviates from the shape, and in particular the volume, of the reference object by less than 30%, preferably less than 15% and particularly preferably by less than 5%.

It is conceivable for the outer unit and the inner unit to be connected to one another at least to some extent in a force-fitting and/or form-fitting manner. It is preferably proposed, however, that the outer unit and the inner unit should be connected to one another at least to some extent, preferably to at least a great extent and particularly preferably fully, in one piece. This makes it possible to reduce production costs, since the wiper-blade adapter can be produced by means of injection molding. It is also possible to increase stability, since it is thus possible to dispense with connecting parts between the inner unit and the outer unit. "At least to some extent in one piece" in this context is intended to mean, in particular, that at least one component of at least one object and/or at least a first object is formed in one piece with at least one component of at least a further object and/or in one piece with at least one further object. "In one piece" in this context is intended to mean, in particular, connected at least integrally, for example by a welding process, an adhesive-bonding process, a molding process and/or some other process regarded as being expedient by a person skilled in the art. In one piece is advantageously also intended to mean in one part. "In one part" is intended to mean, in particular, formed in one piece. This one piece is preferably produced from a single blank, one material and/or one molding compound, particularly preferably by injection molding, in particular injection molding involving one and/or more components. The coupling unit is preferably formed at least to some extent, preferably to at least a great extent and particularly preferably fully, in one piece.

In one configuration of the invention, it is proposed that the outer unit and/or the inner unit should be provided to fix the wiper-arm adapters, in particular a connection between the wiper-arm adapter and the wiper-blade adapter, as a result of which it is possible to increase operational reliability, since uncontrolled detachment of the wiper-arm adapter is avoided. That "an object is fixed" is intended to mean, in particular, that the object withstands an uncontrolled action of force and, in particular, cannot be moved and/or deflected in a non-destructive manner from an envisaged position, connection, coupling and/or fixing.

In order to improve fixing of the different wiper-arm adapters at least in the longitudinal direction, it is proposed that the coupling unit should have at least two, preferably more than two, in particular different longitudinal-form-fit elements, which are provided to fix the wiper-arm adapters at least in a form-fitting manner in the longitudinal direction. The longitudinal-form-fit elements are connected, in particular, in one piece to the outer unit and/or the inner unit. The longitudinal-form-fit elements are provided, in particular, for form-fitting fixing of the wiper-arm adapter to the wiper-blade adapter in the longitudinal direction. It is conceivable for the coupling unit to have as an alternative, and/or in addition, longitudinal force-fit elements, which are provided for force-fitting fixing of the wiper-arm adapter to the wiper-blade adapter in a longitudinal direction. A "longitudinal direction" in this context is intended to mean, in particular, a direction which runs parallel to the longest edge of the smallest imaginary cuboid which only just fully encloses the wiper-blade adapter. The longitudinal-form-fit elements and/or the longitudinal-force-fit elements are designed, in particular, in the form of latching elements and/or stop walls. A "latching element" in this context is intended to mean, in particular, a resilient element for establishing a latching connection, the element being provided to be deflected elastically during a fitting operation.

In order to improve fixing of the different wiper-arm adapters at least in the direction transverse to the longitudinal direction, preferably in the wiping direction and/or in the vertical direction, it is proposed that the coupling unit should have at least two different transverse-form-fit elements which are provided to fix the wiper-arm adapters at least in a form-fitting manner in a direction transverse to a longitudinal direction, in particular in the wiping direction and/or in the vertical direction. The transverse-form-fit elements are connected, in particular, in one piece to the inner unit and/or the outer unit. The transverse-form-fit elements are provided for form-fitting fixing of the wiper-arm adapter to the wiper-blade adapter in a direction transverse to the longitudinal direction. It is conceivable for the coupling unit as an alternative, and/or in addition, to have transverse-force-fit elements, which are provided for force-fitting fixing of the wiper-arm adapter to the wiper-blade adapter in a direction transverse to the longitudinal direction. A "wiping direction" in this context is intended to mean, in particular, a direction in which a wiper blade which is connected to the wiper-blade adapter is guided, in an operating state, over a motor-vehicle window which is to be wiped. The wiping direction is, in particular, at least essentially perpendicular to a longitudinal direction of a wiper arm connected to the wiper-blade adapter and preferably at least essentially perpendicular to a surface of the motor-vehicle window. A "vertical direction" in this context is intended to mean, in particular, a direction which is oriented at least essentially perpendicularly to a motor-vehicle window. The transverse-form-fit elements and/or the transverse-force-fit elements are designed, in particular, in the form of latching elements and/or stop walls, which are formed, in particular, by sides and/or top walls of the inner unit and/or of the outer unit.

It is also proposed that the coupling unit should have at least one guide element, which is provided to serve as an introduction aid when the wiper-arm adapters are being fitted. This makes it possible to simplify the operation of fitting different wiper-arm adapters. The fitting can advantageously be achieved by an end user, as a result of which the level of user-friendliness can be further increased. The guide element is connected, in particular, in one piece to the outer unit and/or the inner unit. "An introduction aid" is intended to mean, in particular, an object which is provided to make it possible, during a fitting operation, for at least two components, in particular the wiper-arm adapter and the wiper-blade adapter, to be arranged in relation to one another and preferably for the wiper-arm adapter to be introduced into the wiper-blade adapter, even in the case of a user positioning the components in an imprecise manner in relation to one another, in particular in the case of an offset which corresponds to not more than 40%, preferably not more than 25% and particularly preferably not more than 5%, of the width of at least one of the components. "Fitting" in this context is intended to mean, in particular, an operation which is carried out by an end user or end consumer, the operation comprising at least one final fitting step which allows the wiper device to be put into operation. An "end user" in this context is intended to mean, in particular, an end consumer and/or a private individual who has at least general technical skills. In particular, the end user is not a production worker and/or workshop employee and/or a person with extensive technical skills and/or a person skilled in the relevant art. Further advantageously, the end user carries out a fitting operation in a tool-free manner.

In one configuration of the invention, it is proposed that the guide element should be formed at least to some extent in one piece with at least one, in particular with a single one, of the longitudinal-form-fit elements. This makes it possible to do away with further components and, in particular, an installation space, and therefore to reduce costs.

In a preferred configuration of the invention, it is proposed that, as seen in at least one view, in particular plan view, the guide element should be at least to some extent at least essentially V-shaped, preferably in a direction transverse to the longitudinal direction and particularly preferably in the vertical direction. This allows for a particularly stable design.

In a particularly preferred configuration of the invention, it is proposed that the guide element should be provided to be deflected at least to some extent, in particular elastically, when the wiper-arm adapters are being fitted. In particular, the guide element is an elastic element. An "elastic element" is intended to mean, in particular, an element which can be repeatedly deformed without the element being mechanically damaged or destroyed as a result and which, in particular following deformation, automatically tends toward a basic shape again. The guide element is provided, in particular, to be deflected first of all by the wiper-arm adapter during a fitting operation and, in particular when the wiper-arm adapter is arranged in the accommodating space, tends to return to a basic shape. The guide element is provided, in particular, to be deflected in a direction transverse to the longitudinal direction, preferably in the wiping direction.

The wiping device here is not intended to be limited to the abovedescribed use and embodiment. In particular, the wiper device, in order to perform a function described herein, may have a number of individual elements, components and units which differs from the number mentioned herein.

BRIEF DESCRIPTION OF THE DRAWINGS

Further advantages can be gathered from the following description of the drawing. The drawing illustrates an exemplary embodiment of the invention. The drawing, the description and the claims contain numerous features in combination. A person skilled in the art will expediently also consider the features individually and combine them to give further advantageous combinations.

In the drawing.

DETAILED DESCRIPTION

Figure 1:
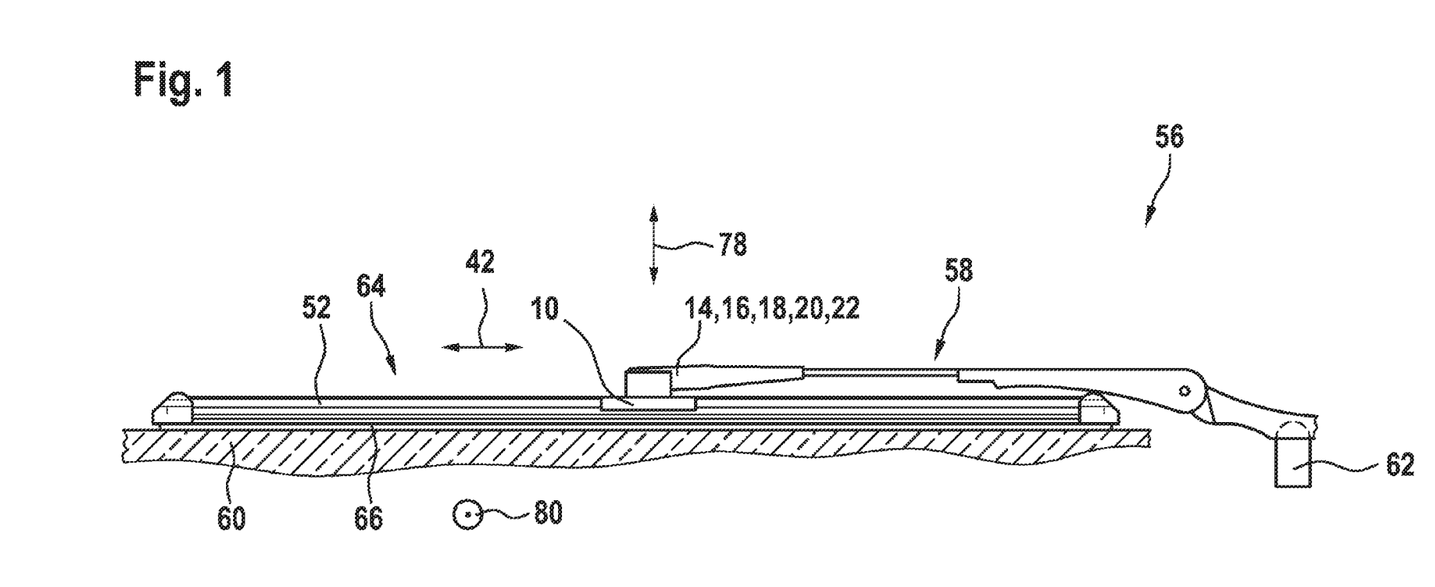
FIG. 1 shows a side view of a wiper having a wiper device and a wiper arm.

FIG. 1 shows a side view of a wiper 56 having a wiper device and a wiper arm 58. The wiper 56 is designed in the form of a flat wiper. The wiper 56 is provided for cleaning a motor-vehicle window 60. The wiper arm 58 is provided for fastening on a drive shaft 62 of the wiper 56. The drive shaft 62 is designed such that it can be rotated in an oscillating manner by a drive motor (not illustrated specifically). The wiper device can be driven to swing in a pivoting movement over the motor-vehicle window 60 via the wiper arm 58. The wiper 56 has a wiper blade 64. During wiping operation, a wiper strip 66 of the wiper blade 64 passes over the motor-vehicle window 60. The wiper arm 58 has a wiper-arm adapter 14, 16, 18, 20, 22. In the present case, the wiper-arm adapter 14, 16, 18, 20, 22 is designed in the form of a top lock adapter. As an alternative, or in addition, the wiper-arm adapter may be designed in a manner which is known to a person skilled in the art, to be precise, in particular, in the form of a side lock adapter. The wiper-arm adapter 14, 16, 18, 20, 22 is a wiper-arm adapter from a group of different wiper-arm adapters of different types. The group of wiper-arm adapters comprises at least one RB-TL2 wiper-arm adapter 14, at least one RB-TL2.2 wiper-arm adapter 16, at least one RB-TL2.1 wiper-arm adapter 18, at least one VA-TL2 wiper-arm adapter 20 and/or at least one VA-TL2.1 wiper-arm adapter 22. The wiper device also has a wiper-blade adapter 10. The wiper-blade adapter 10 is provided optionally for coupling to the wiper-arm adapter 14, 16, 18, 20, 22.

Figure 2:
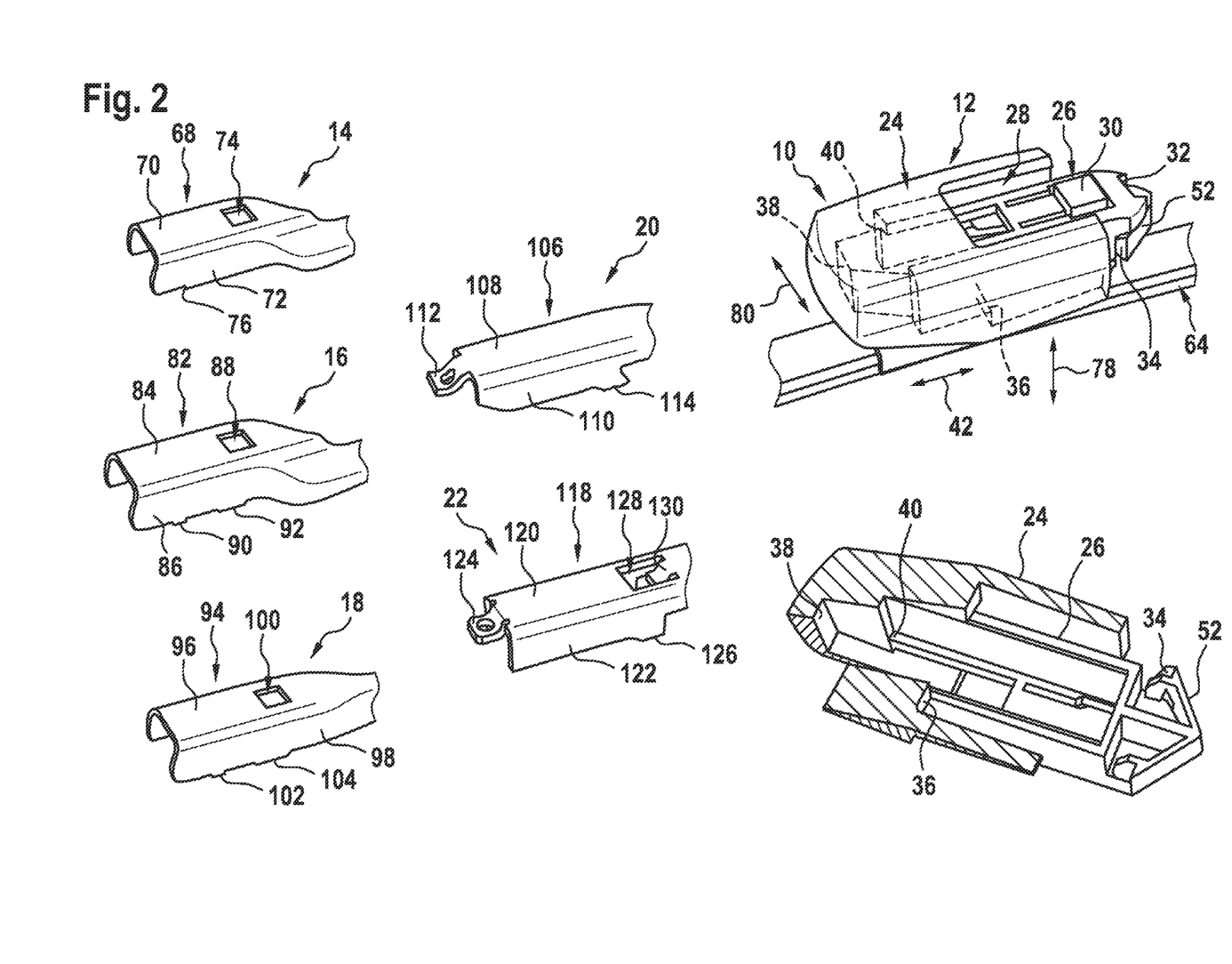
FIG. 2 shows a perspective illustration of different wiper-arm adapters and a wiper-blade adapter of the wiper device, said wiper-blade adapter being provided for coupling to the different wiper-arm adapters.
Figure 3A:
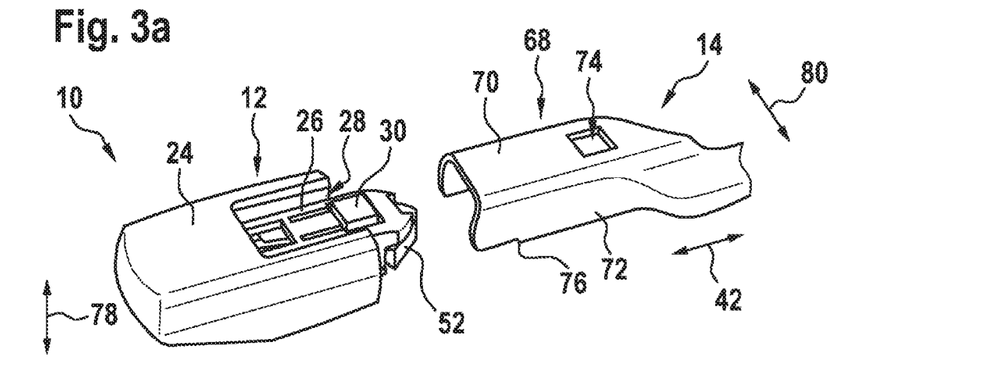
FIGS. 3a-d show a number of views of an operation of fitting a first wiper-arm adapter to the wiper-blade adapter.
Figure 3B:
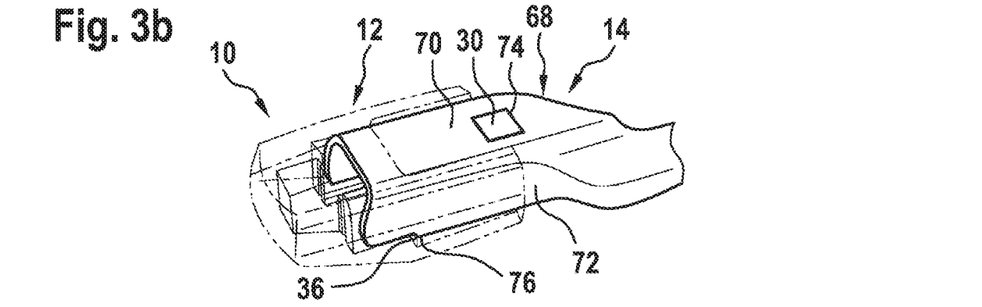
Figure 3C:
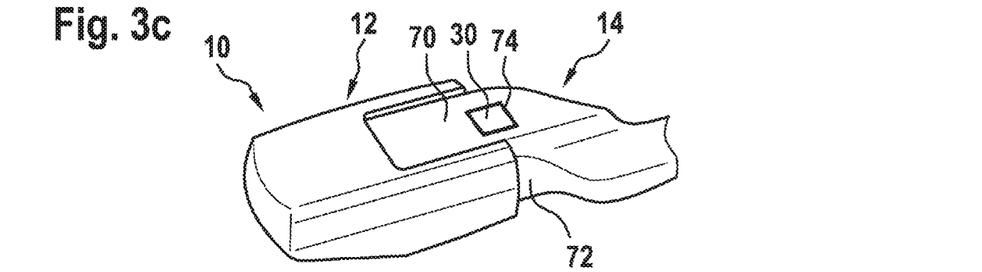
Figure 3D:
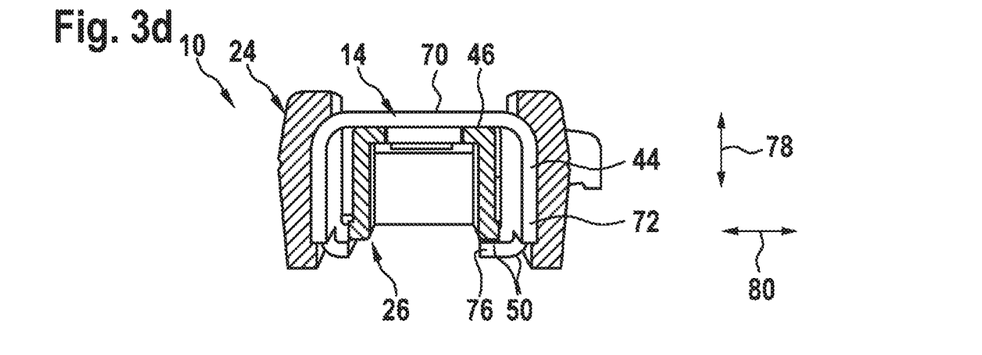
Figure 4A:
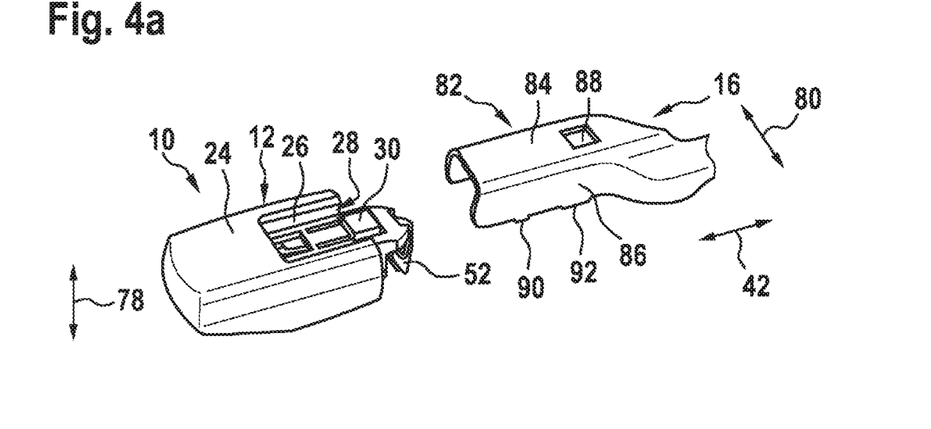
FIGS. 4a-g show a number of views of an operation of fitting a second and/or third wiper-arm adapter to the wiper-blade adapter.
Figure 4B:
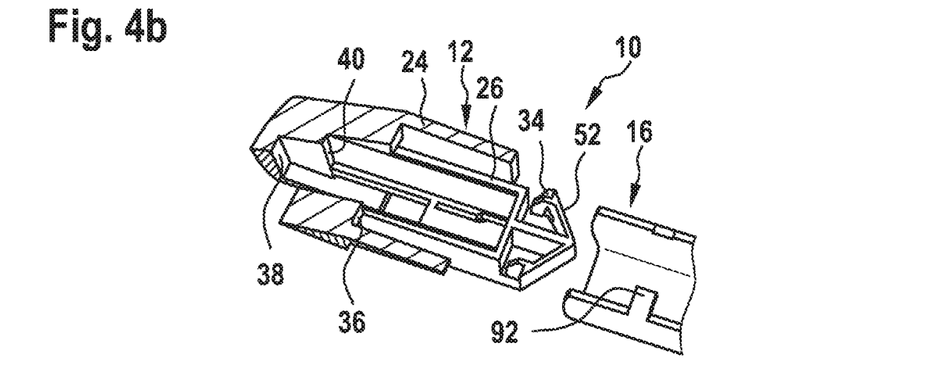
Figure 4C:
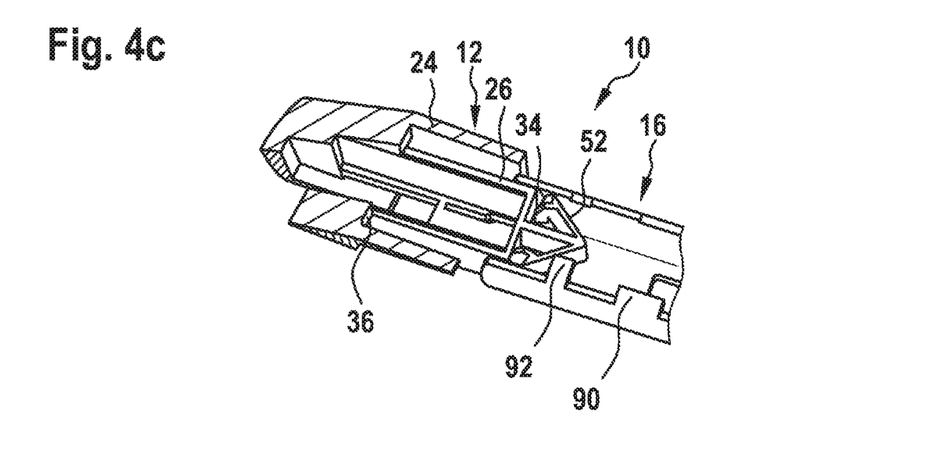
Figure 4D:
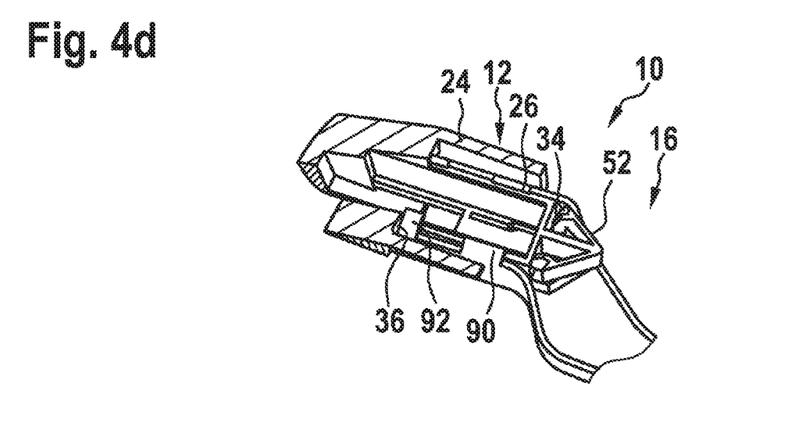
Figure 4E:
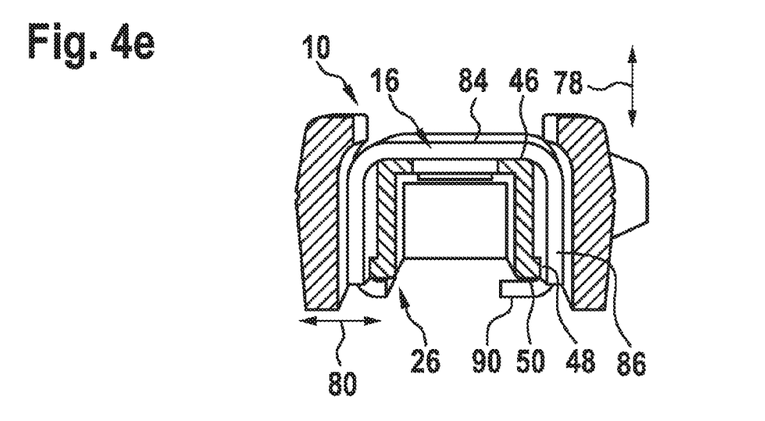
Figure 4F:
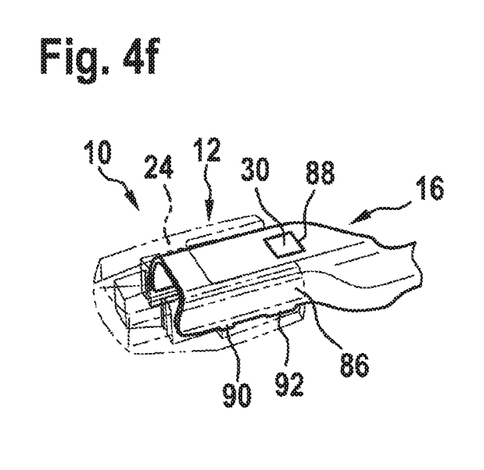
Figure 4G:
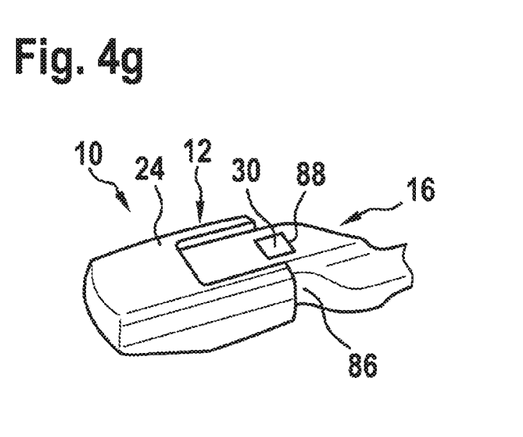
Figure 5A:
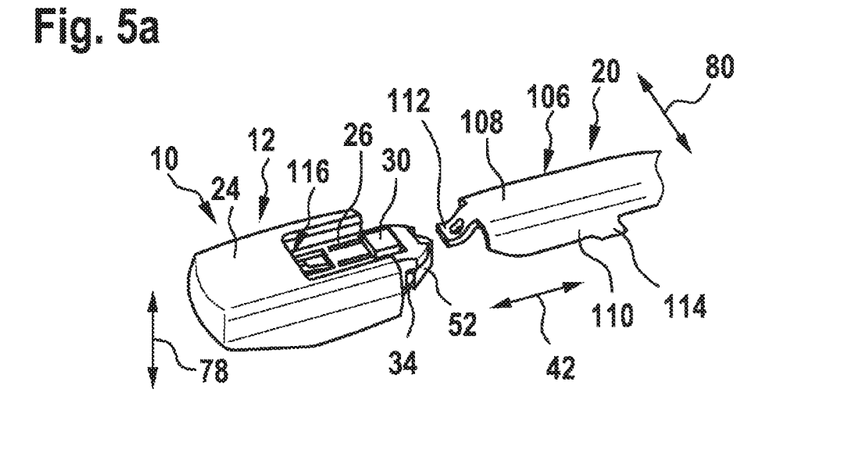
FIGS. 5a-h show a number of views of an operation of fitting a fourth wiper-arm adapter to the wiper-blade adapter.
Figure 5B:
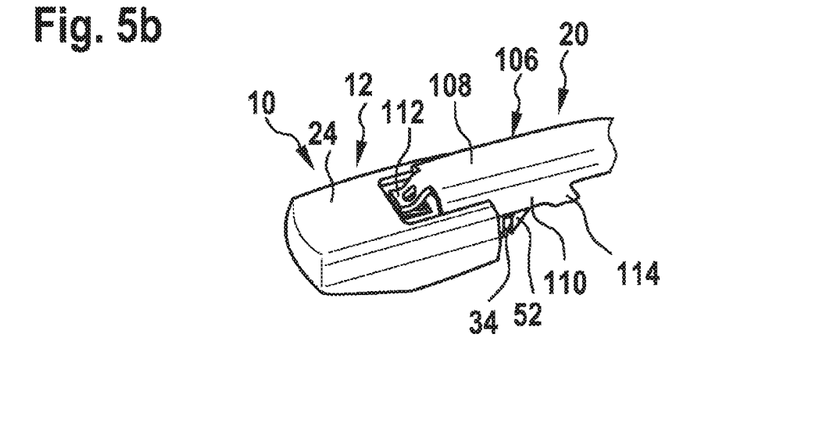
Figure 5C:
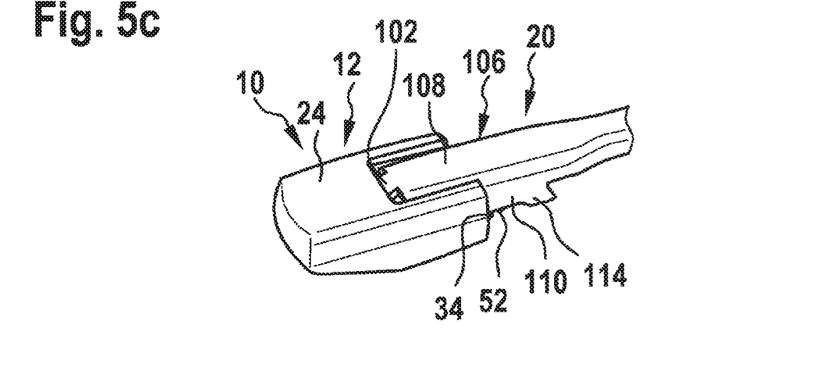
Figure 5D:
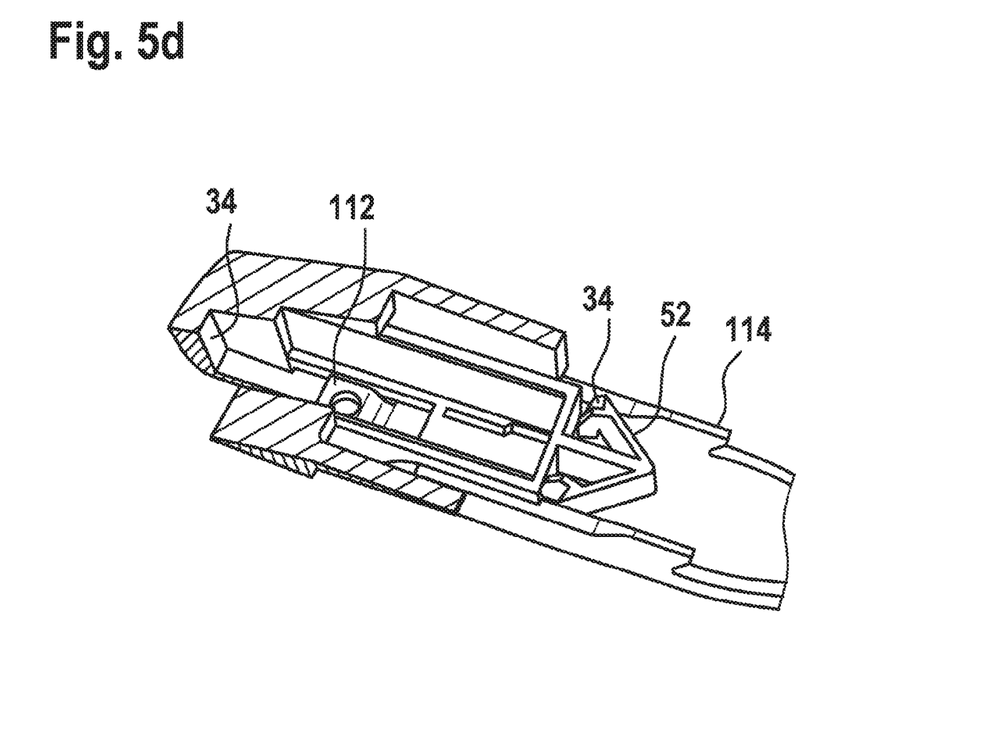
Figure 5E:
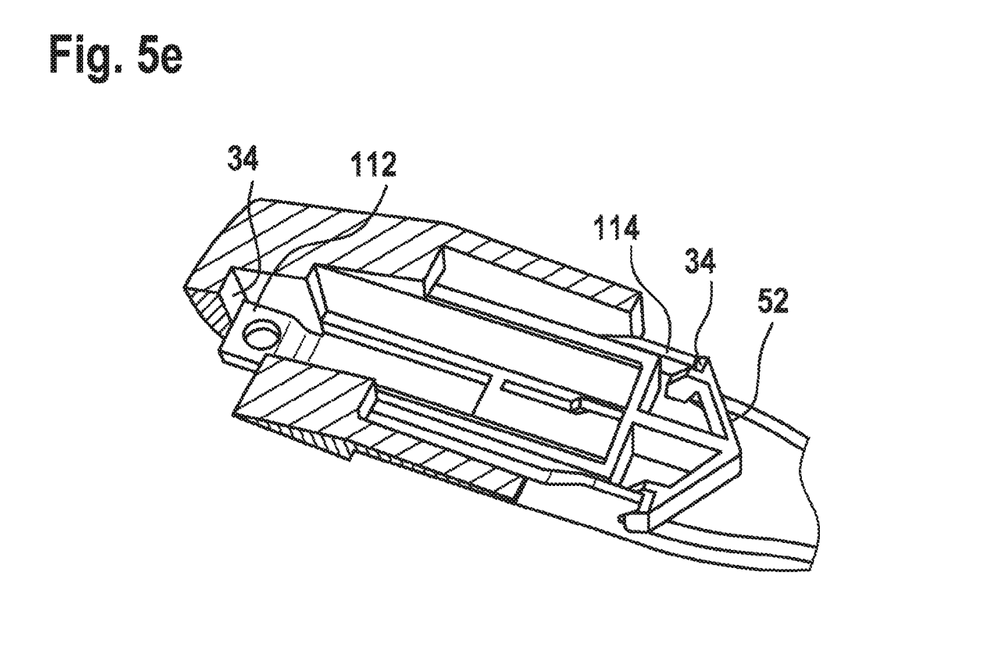
Figure 5F:
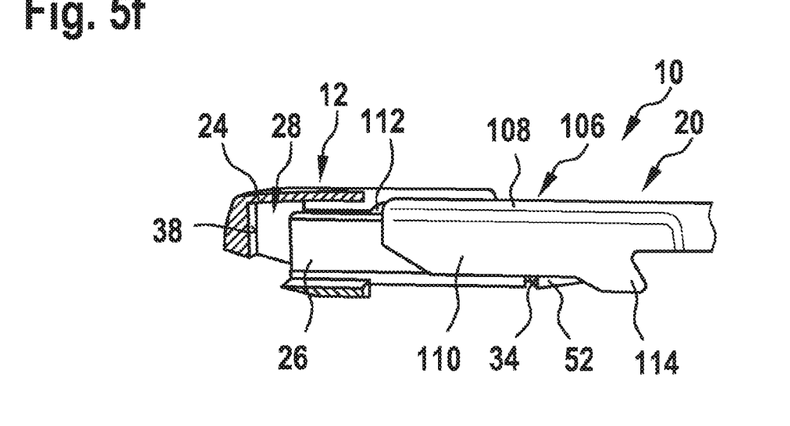
Figure 5G:
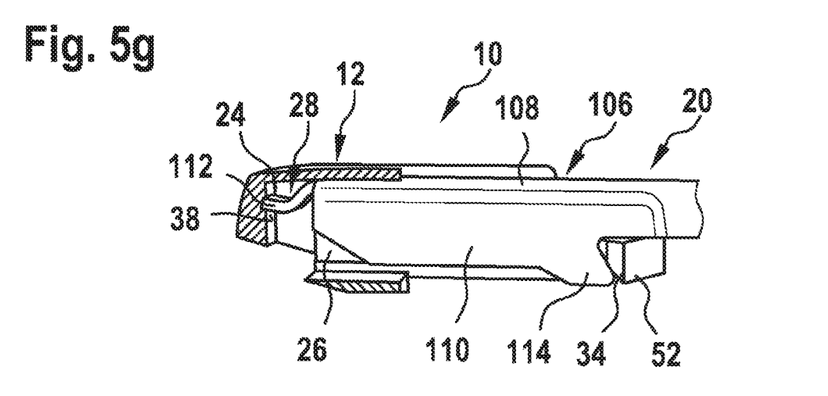
Figure 5H:
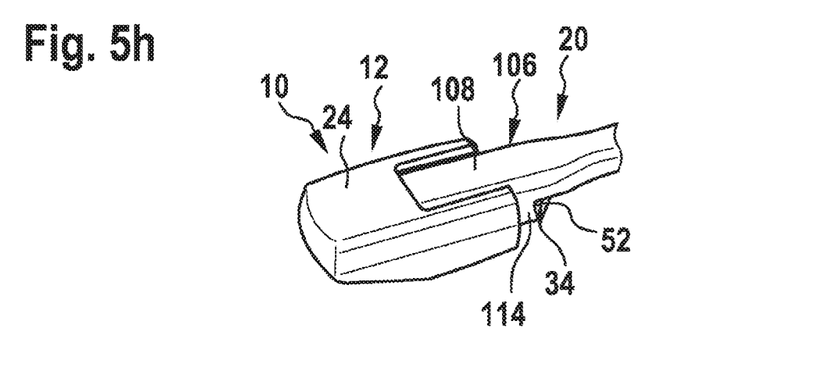
Figure 6A:
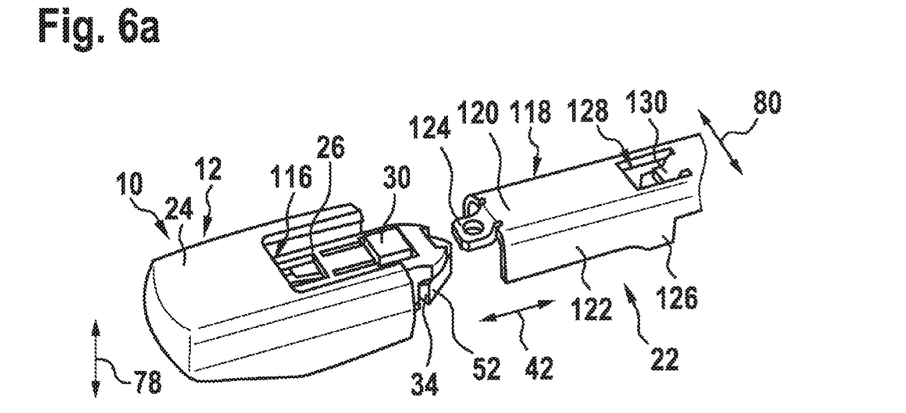
FIGS. 6a-e show a number of views of an operation of fitting a fifth wiper-arm adapter to the wiper-blade adapter.
Figure 6B:
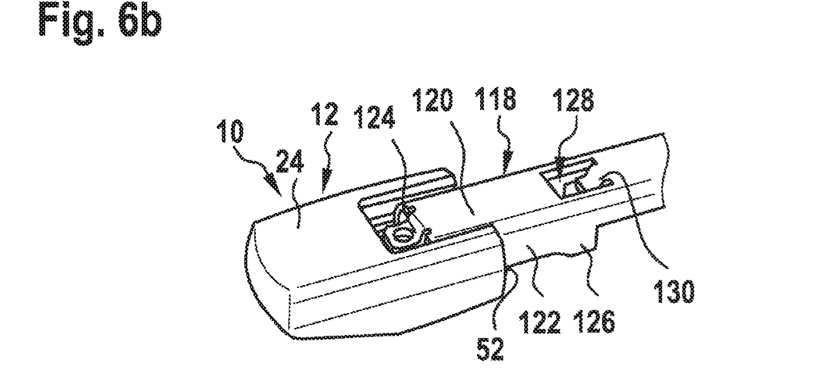
Figure 6C:
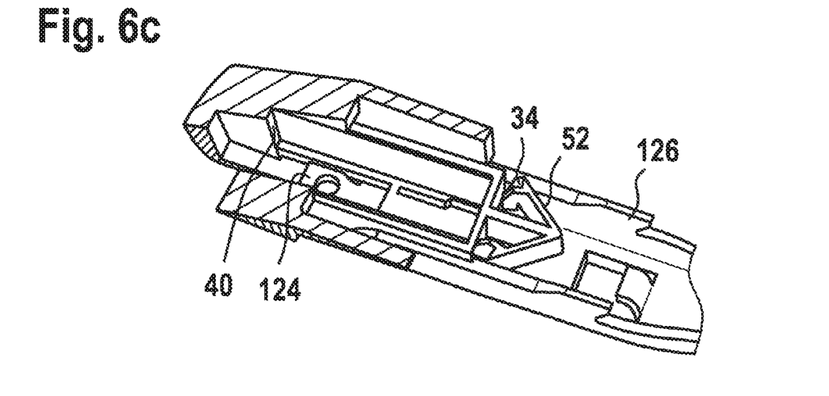
Figure 6D:
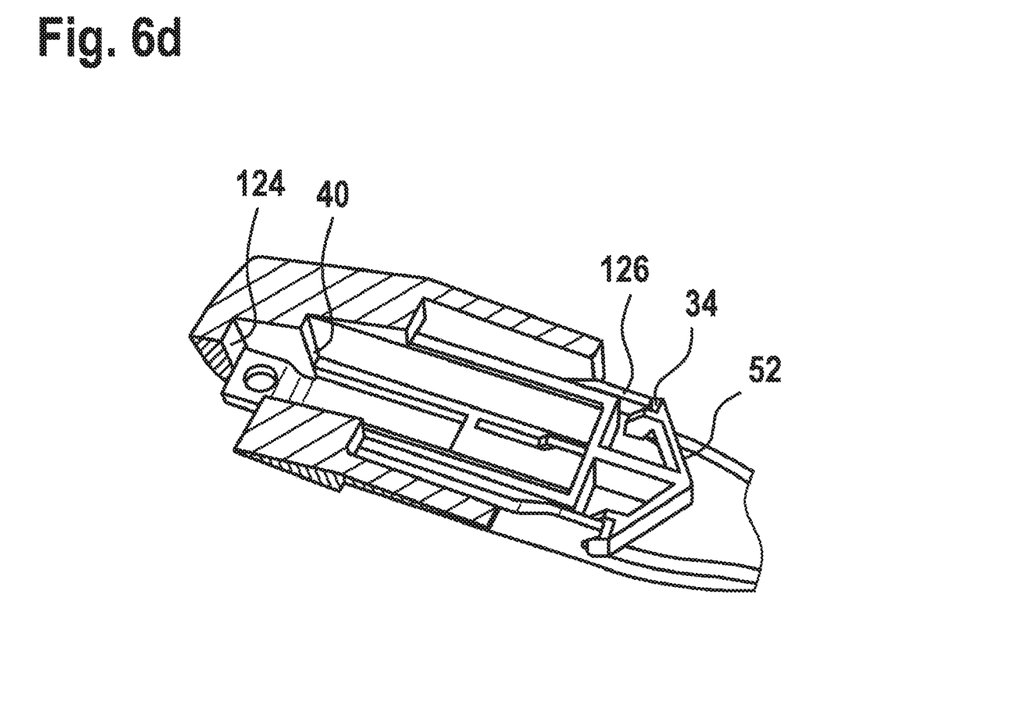
Figure 6E:
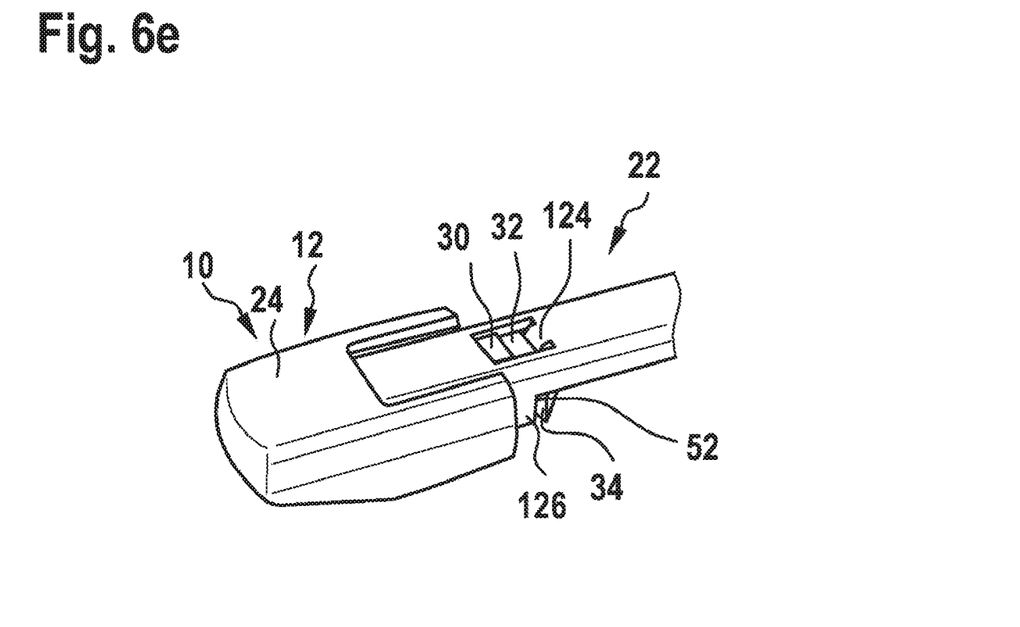

FIG. 2 shows a perspective illustration of the different wiper-arm adapters 14, 16, 18, 20, 22 and the wiper-blade adapter 10, which is provided for coupling to the wiper-arm adapters 14, 16, 18, 20, 22.

The first wiper-arm adapter 14 is a wiper-arm adapter of the RB-TL2 type. The wiper-arm adapter 14 has a main body 68. The wiper-arm adapter 14 also has a main wall 70. The wiper-arm adapter 14 has side walls 72, which are arranged at least essentially perpendicularly on the main wall 70. The main wall 70 and the side walls 72 together form the entire main body 68. As seen in plan view, the main body 68 is at least essentially s-shaped. The wiper-arm adapter 14 comprises a fastening aperture 74, which is arranged in the main wall 70. The wiper-arm adapter 14 also has a fastening means 76 for each side wall 72. The fastening means 76 are arranged on the respective side wall 72 and are connected thereto in one piece.

The second wiper-arm adapter 16 is a wiper-arm adapter of the RB-TL2.2 type. The wiper-arm adapter 16 has a main body 82. The wiper-arm adapter 16 also has a main wall 84. The wiper-arm adapter 16 has side walls 86, which are arranged on the main wall 84. The main wall 84 and the side walls 86 together form the entire main body 82. As seen in plan view, the main body 82 is at least essentially s-shaped. The wiper-arm adapter 16 comprises a fastening aperture 88, which is arranged in the main wall 84. The wiper-arm adapter 16 also has two fastening means 90, 92 for each side wall 86. The fastening means 90, 92 are arranged on the respective side wall 86 and are connected thereto in one piece.

The third wiper-arm adapter 18 is a wiper-arm adapter of the RB-TL2.1 type. The wiper-arm adapter 18 has a main body 94. The wiper-arm adapter 18 also has a main wall 96. The wiper-arm adapter 18 has side walls 98, which are arranged on the main wall 96. The main wall 96 and the side walls 98 together form the entire main body 94. As seen in a plan view, the main body 94 is at least essentially I-shaped. The wiper-arm adapter 18 comprises a fastening aperture 100, which is arranged in the main wall 96. The wiper-arm adapter 18 also has two fastening means 102, 104 for each side wall 98. The fastening means 102, 104 are arranged on the respective side wall 98 and are connected thereto in one piece.

The fourth wiper-arm adapter 20 is a wiper-arm adapter of the VA-TL2 type. The wiper-arm adapter 20 has a main body 106. The wiper-arm adapter 20 also has a main wall 108. The wiper-arm adapter 20 has side walls 110, which are arranged on the main wall 108. The main wall 108 and the side walls 110 together form the entire main body 106. As seen in plan view, the main body 106 is at least essentially I-shaped. The wiper-arm adapter 20 comprises a fastening nose 112. The fastening nose 112 is arranged at a free end of the wiper-arm adapter 20. The fastening nose 112 is designed in the form of an extension of the main wall 108. The wiper-arm adapter 20 comprises at least one backstop 114 for each side wall 110. The backstop 114 is arranged on the respective side wall 110 and is connected thereto in one piece.

The fifth wiper-arm adapter 22 is a wiper-arm adapter of the VA-TL2.1 type. The wiper-arm adapter 22 has a main body 118. The wiper-arm adapter 22 also has a main wall 120. The wiper-arm adapter 22 also has side walls 122, which are arranged on the main wall 120. The main wall 120 and the side walls 122 together form the entire main body 118. As seen in plan view, the main body 118 is at least essentially I-shaped. The wiper-arm adapter 22 comprises a fastening nose 124. The fastening nose 124 is arranged at a free end of the wiper-arm adapter 22. The fastening nose 124 is designed in the form of an extension of the main wall 120. The wiper-arm adapter 22 comprises at least one backstop 126 for each side wall 122, the backstop being arranged on the respective side wall 122 and being connected thereto in one piece. The wiper-arm adapter 22 comprises a fastening aperture 128, which is advantageously arranged in the main wall 120. The wiper-arm adapter 22 also comprises a further fastening nose 130, which projects to some extent into the fastening aperture 128 and is advantageously designed in the form of an extension of the main wall 120.

The wiper-blade adapter 10 comprises a coupling unit 12. In a fitted state, the coupling unit 12 establishes a connection optionally to one of the wiper-arm adapters 14, 16, 18, 20, 22. The coupling unit 12 may also be provided for connection and/or coupling to further types of wiper-arm adapter which are known to a person skilled in the art. The coupling unit 12 has an outer unit 24. The coupling unit 12 has an inner unit 26. In a fitted state, the outer unit 24 and/or the inner unit 26 fix/fixes the wiper-arm adapter 14, 16, 18, 20, 22 (not shown here). The outer unit 24 engages around the inner unit 26 at least to some extent. The outer unit 24 and the inner unit 26 are arranged at least essentially in an immovable manner relative to one another. The outer unit 24 and the inner unit 26 are connected to one another at least to some extent in one piece. In the present case, the outer unit 24 and the inner unit 26 are even formed in one part. The outer unit 24 and the inner unit 26 are produced from one material by means of injection molding. As an alternative, however, it is also conceivable for the outer unit and inner unit each to be produced individually and then to be fastened on one another by adhesive bonding and/or welding. The outer unit 24 and the inner unit 26 together delimit at least to some extent an accommodating space 28. The wiper-arm adapter 14, 16, 18, 20, 22 can be arranged within the accommodating space 28.

In order to fix the wiper-arm adapter 14, 16, 18, 20, 22 at least in a form-fitting manner at least in a longitudinal direction 42, the coupling unit 12 has at least six different longitudinal-form-fit elements 30, 32, 34, 36, 38, 40. The longitudinal-form-fit elements 30, 32, 34, 36, 38, 40 are designed to correspond to the wiper-arm adapters 14, 16, 18, 20, 22 and particularly preferably to at least one element and/or component of the wiper-arm adapter 14, 16, 18, 20, 22. The longitudinal-form-fit elements 30, 32, 34, 36, 38, 40 are connected to the outer unit 24 and/or the inner unit 26 in one piece. The coupling unit 12 has a first longitudinal-form-fit element 30. The first longitudinal-form-fit element 30 is arranged on a side of the inner unit 26 which is directed away from the wiper blade 64. The first longitudinal-form-fit element 30 is connected to the inner unit 26 in one piece. The first longitudinal-form-fit element 30 is also designed in the form of a latching element. The coupling unit 12 also has a second longitudinal-form-fit element 32. The second longitudinal-form-fit element 32, in a fitted state, is arranged on a side of the inner unit 26 which is directed toward the wiper arm 58 (not illustrated here). The second longitudinal-form-fit element 32 is connected to the inner unit 26 in one piece. The second longitudinal-form-fit element 32 forms a stop edge. The coupling unit 12 also has a third longitudinal-form-fit element 34. The third longitudinal-form-fit element 34 is arranged on a side of the inner unit 26 which is directed toward the wiper blade 64. The third longitudinal-form-fit element 34 is connected to the inner unit 26 in one piece. The third longitudinal-form-fit element 34 is designed in the form of a latching element. The coupling unit 12 also has two fourth longitudinal-form-fit elements 36 (only one of which is shown here). The fourth longitudinal-form-fit elements 36 are arranged opposite one another and in a central manner on those sides of the outer unit 24 which are directed away from the wiper blade 64. The fourth longitudinal-form-fit elements 36 are connected to the outer unit 24 in one piece. The fourth longitudinal-form-fit elements 36 are designed in the form of stop edges. The coupling unit 12 also has a fifth longitudinal-form-fit element 38. The fifth longitudinal-form-fit element 38 is arranged on a side of the outer unit 24 which is directed toward the inner unit 26. The fifth longitudinal-form-fit element 38 is connected to the outer unit 24 in one piece. The fifth longitudinal-form-fit element 38 is designed in the form of a stop wall. The coupling unit 12 also has a sixth longitudinal-form-fit element 40. The sixth longitudinal-form-fit element 40 is arranged on a side of the inner unit 26 which is directed toward the outer unit 24, and is oriented perpendicularly to the wiper blade 64. The sixth longitudinal-form-fit element 40 is connected to the inner unit 26 in one piece. The sixth longitudinal-form-fit element 40 is designed in the form of a stop edge. It is conceivable for the coupling unit to have as an alternative, and/or in addition and in particular instead of the longitudinal-form-fit elements, longitudinal-force-fit elements, which are provided for force-fitting fixing of the wiper-arm adapter to the wiper-blade adapter in a longitudinal direction. It would also be possible for the longitudinal-form-fit elements to contribute to fixing in a direction other than the longitudinal direction.

In order to fix the wiper-arm adapter 14, 16, 18, 20, 22 at least in a form-fitting manner at least in a direction 78, 80 transverse to the longitudinal direction 42, in particular in a vertical direction 78 and/or a wiping direction 80, the coupling unit 12 has four different transverse-form-fit elements 44, 46, 48, 50. The transverse-form-fit elements 44, 46, 48, 50 are designed to correspond to at least one of the wiper-arm adapters 14, 16, 18, 20, 22 and particularly preferably to at least one element and/or component of the wiper-arm adapter 14, 16, 18, 20, 22. The transverse-form-fit elements 44, 46, 48, 50 are connected to the outer unit 24 and/or the inner unit 26 in one piece. The transverse-form-fit elements 44, 46, 48, 50 are designed in the form of stop walls, which are formed by sides and/or top walls of the outer unit 24 and/or of the inner unit 26.

The coupling unit 12 has two first transverse-form-fit elements 30. The first transverse-form-fit elements 30 are formed by mutually opposite side walls of the outer unit 24 which are directed toward the inner unit 26. A second transverse-form-fit element 46 of the coupling unit 12 is formed by a top wall of the inner unit 26, said top wall being directed away from the wiper blade 64. Two third transverse-form-fit elements 48 of the coupling unit 12 are formed by side walls of the inner unit 26 which are directed toward the outer unit 24. Two fourth transverse-form-fit elements 50 of the coupling unit 12 are formed by side walls of the inner unit 26 which are directed toward the wiper blade 64.

It is conceivable for the coupling unit to have as an alternative, and/or in addition and in particular instead of the transverse-form-fit elements, transverse-force-fit elements, which are provided for force-fitting fixing of the wiper-arm adapter to the wiper-blade adapter in a direction transverse to the longitudinal direction.

The inner unit 26 has at least one guide element 52. The guide element 52 serves as an introduction aid when the wiper-arm adapters 14, 16, 18, 20, 22 are being fitted. The guide element 52 is arranged on a side of the inner unit 26 which is directed away from the outer unit 24. As seen in at least plan view, the guide element 52 is at least to some extent V-shaped. The guide element 52 is deflected at least to some extent elastically when the wiper-arm adapters 14, 16, 18, 20, 22 are being fitted. The guide element 52 is formed at least to some extent in one piece with the third longitudinal-form-fit element 34.

FIGS. 3*a-d* illustrate an operation of fitting the first wiper-arm adapter 14 to the wiper-blade adapter 10. During a fitting operation, the wiper-arm adapter 14 is introduced into the accommodating space 28 in the longitudinal direction 42. The guide element 52 here serves as an introduction aid. When the wiper-arm adapter 14 is being introduced, the first longitudinal-form-fit element 30 is deflected elastically. The first longitudinal-form-fit element 30 here yields to the first wiper-arm adapter 14 and frees the accommodating space 28. The wiper-arm adapter 14 is introduced into the accommodating space 28 until the fastening means 76 strike against the fourth longitudinal-form-fit elements 36 of the wiper-blade adapter 10. This completes the operation of introducing the wiper-arm adapter 14 into the accommodating space 28. The first longitudinal-form-fit element 30 engages in the fastening aperture 74 of the wiper-arm adapter 14. The wiper-arm adapter 14 is fixed in a form-fitting manner in the longitudinal direction 42 by the first longitudinal-form-fit element 30 and the fourth longitudinal-form-fit element 36. The wiper-arm adapter 14 is also fixed in the directions 78, 80 transverse to the longitudinal direction 42 by means of the transverse-form-fit elements 44, 46, 50. The wiper-arm adapter 14 engages around the inner unit 26. The main wall 70 establishes contact with the second transverse-form-fit element 46. The fastening means 76 also establish contact with the fourth transverse-form-fit elements 50. The wiper-arm adapter 14 is thus fixed in the vertical direction 78. The outer unit 24 also engages around the wiper-arm adapter 14. The side walls 72 of the wiper-arm adapter 10 establish contact with the first transverse-form-fit elements 44. The wiper-arm adapter 10 is thus fixed in the wiping direction 80.

FIGS. 4a-g illustrate an operation of fitting the second wiper-arm adapter 16 and/or the third wiper-arm adapter 18 to the wiper-blade adapter 10. During a fitting operation, the wiper-arm adapter 16 is introduced into the accommodating space 28 in the longitudinal direction 42. The guide element 52 of the inner unit 26 here serves as an introduction aid. When the wiper-arm adapter 16 is being introduced, the third longitudinal-form-fit element 34 is deflected elastically. The first longitudinal-form-fit element 30 also yields elastically to the wiper-arm adapter 18 and frees the accommodating space 28. The wiper-arm adapter 16 is introduced into the accommodating space 28 until the fastening means 90, 92 strike against the fourth longitudinal-form-fit element 36 of the wiper-blade adapter 10. Once the operation of introducing the wiper-arm adapter 16 into the accommodating space 28 of the wiper-blade adapter 10 has been completed, the first longitudinal-form-fit element 30 engages in the fastening aperture 88 of the wiper-arm adapter 16. The wiper-arm adapter 16 is fixed in a form-fitting manner in the longitudinal direction 42 by the first longitudinal-form-fit element 30 and the fourth longitudinal-form-fit element 36. It is also the case that the elastically deflected third longitudinal-form-fit element 34 subjects the side walls 86 of the wiper-arm adapter 16 to a force. The third longitudinal-form-fit element 36 here serves, in addition, as a longitudinal-force-fit element. The wiper-arm adapter 16 can thus be fixed, in addition, in a force-fitting manner in the longitudinal direction 42. The wiper-arm adapter 14 is also fixed in directions 78, 80 transverse to the longitudinal direction 42 by means of the transverse-form-fit elements 46, 48, 50. The wiper-arm adapter 16 engages around the inner unit 26. The main wall 70 establishes contact with the second transverse-form-fit element 46. The fastening means 90, 92 also establish contact with the fourth transverse-form-fit elements 50. The wiper-arm adapter 16 is thus fixed in a vertical direction 78. The side walls 86 of the wiper-arm adapter 16 establish contact with the third transverse-form-fit elements 48. The wiper-arm adapter 16 is thus fixed in the wiping direction 80.

An operation of fitting the third wiper-arm adapter 18 (not illustrated here) to the wiper-blade adapter 10 takes place in a manner analogous to the operation for the second wiper-arm adapter 16. The third wiper-arm adapter 18 differs essentially by the shape of the main body 94.

FIGS. 5a-h illustrate an operation of fitting the fourth wiper-arm adapter 20 to the wiper-blade adapter 10. During a fitting operation, the wiper-arm adapter 20 is introduced into the accommodating space 28 in the longitudinal direction 42. The guide element 52 here serves as an introduction aid. When the wiper-arm adapter 20 is being introduced, the third longitudinal-form-fit element 34 is deflected elastically. The third longitudinal-form-fit element 34 here yields to the wiper-arm adapter 20 and frees the accommodating space 28. When the wiper-arm adapter 20 is being introduced, the first longitudinal-form-fit element 30 is deflected elastically. The inner unit 26 has a guide aperture 116. The guide aperture 116 is provided for guiding the fastening nose 112. For this purpose, the fastening nose 112 is introduced into the guide aperture 116. The wiper-arm adapter 20 is introduced into the accommodating space 28 until the fastening nose 112 strikes against the fifth longitudinal-form-fit element 38 of the wiper-blade adapter 10. Once introduction of the wiper-arm adapter 20 into the accommodating space 28 has been completed, the third longitudinal-form-fit element 34 is free and returns elastically into a basic shape. The backstops 114 here engage in the third longitudinal-form-fit element 34. The longitudinal-form-fit elements 34, 38 fix the wiper-arm adapter 20 in the longitudinal direction 42. The wiper-arm adapter 20 also engages around the inner unit 26. The outer unit 24 also engages around the wiper-arm adapter 20. For fixing in directions 78, 80 transverse to the longitudinal direction 42, the main wall 108 establishes contact with the second transverse-form-fit element 46, the side walls 110 establish contact with the first transverse-form-fit element 44 and/or the side walls 110 establish contact with the third transverse-form-fit element 48.

FIGS. 6a-e illustrate an operation of fitting the fifth wiper-arm adapter 22 to the wiper-blade adapter 10. During a fitting operation, the wiper-arm adapter 22 is introduced into the accommodating space 28 in the longitudinal direction 42. The guide element 52 here serves as an introduction aid. When the wiper-arm adapter 20 is being introduced, the third longitudinal-form-fit element 34 is deflected elastically. The third longitudinal-form-fit element 34 here yields to the wiper-arm adapter 22 and frees the accommodating space 28. When the wiper-arm adapter 22 is being introduced, the first longitudinal-form-fit element 30 is deflected elastically. The fastening nose 124 is introduced into the guide aperture 116. The wiper-arm adapter 22 is introduced into the accommodating space 28 until the fastening nose 130 strikes against the second longitudinal-form-fit element 32 of the wiper-blade adapter 10. Once introduction of the wiper-arm adapter 20 into the accommodating space 28 has been completed, the third longitudinal-form-fit element 34 is free and returns elastically into a basic shape. The backstops 126 here engage in the third longitudinal-form-fit element 34. It is also the case that the fastening nose 124 butts against the sixth longitudinal-form-fit element 40. The longitudinal-form-fit elements 32, 34, 40 fix the wiper-arm adapter 20 in the longitudinal direction 42. The outer unit 24 also engages around the wiper-arm adapter 22. For fixing in directions 78, 80 transverse to the longitudinal direction 42, the main wall 120 establishes contact with the second transverse-form-fit element 46, the side walls 122 establish contact with the first transverse-form-fit element 44 and/or the side walls 122 establish contact with the third transverse-form-fit element 48.

What is claimed is:

1. A wiper device having a wiper-blade adapter (10) comprising at least one coupling unit (12), which is configured to establish a connection to at least two different wiper-arm adapters (14, 16, 18, 20, 22) and which has at least one outer unit (24) and at least one inner unit (26), wherein the outer unit (24) engages around the inner unit at least to some extent, the outer unit and the inner unit together delimiting at least to some extent an accommodating space (28) for the wiper-arm adapters (14, 16, 18, 20, 22), and the outer unit and the inner unit being arranged at least essentially in an immovable manner relative to one another, the coupling unit (12) has at least two different longitudinal-form-fit elements (30, 32, 34, 36, 38, 40), which are configured to fix the wiper-arm adapters (14, 16, 18, 20, 22) at least in a form-fitting manner in a longitudinal direction (42), wherein the coupling unit (12) is configured to fix the at least two different wiper arm adapters in a longitudinal direction (42), wherein the coupling unit (12) includes at least one guide element (52) which is configured to aid introduction of the at least two different wiper-arm adapters (14, 16, 18, 20, 22) when the at least two different wiper-arm adapters are being fitted into the coupling unit (12), wherein the at least one guide element (52) is formed in one piece with one of the longitudinal-form-fit elements (34), and is configured to be deflected in a wiping direction (80) that is transverse to both the longitudinal direction (42) and to a vertical direction (78), wherein the coupling unit (12) extends along a longitudinal direction (42), wherein the at least one guide element (52) includes an elongate arm extending at an oblique angle relative to the longitudinal direction (42), wherein the at least one guide element (52) is configured to flex and rotate about a vertical axis that extends along the vertical direction (78), and wherein the one of the longitudinal form-fit elements (34) is positioned at an end of the at least one guide element (52) and is disposed between the vertical axis and the outer unit (24) along the longitudinal direction (42).

2. The wiper device as claimed in claim 1, characterized in that the outer unit (24) and the inner unit (26) are connected to one another at least to some extent in one piece.

3. The wiper device as claimed in claim 1, characterized in that at least one of the outer unit (24) and the inner unit (26) is configured to fix the wiper-arm adapters (14, 16, 18, 20, 22).

4. The wiper device as claimed in claim 1, characterized in that the coupling unit (12) has at least two different transverse-form-fit elements (44, 46, 48, 50), which are configured to fix the wiper-arm adapters (14, 16, 18, 20, 22) at least in a form-fitting manner in a direction transverse to a longitudinal direction (42).

5. The wiper device as claimed in claim 1, characterized in that, as seen in at least one view, the guide element (52) is at least to some extent V-shaped.

6. The wiper device as claimed in claim 1, characterized in that the guide element (52) is configured to be deflected at least to some extent when the wiper-arm adapters (14, 16, 18, 20, 22) are being fitted.

7. A wiper having at least one wiper device as claimed in claim 1.

8. A modular construction system having a wiper device as claimed in claim 1 and having at least four different wiper-arm adapters (14, 16, 18, 20, 22) to which the coupling unit (12) is configured to establish a connection.

9. The wiper device as claimed in claim 1, wherein the coupling unit (12) has at least six different longitudinal-form-fit elements (30, 32, 34, 36, 38, 40), which are configured to fix the at least four different wiper-arm adapters (14, 16, 18, 20, 22) at least in a form-fitting manner in a longitudinal direction (42).

10. The wiper device as claimed in claim 1, wherein the coupling unit (12) has at least four different transverse-form-fit elements (44, 46, 48, 50), which are configured to fix the at least four different wiper-arm adapters (14, 16, 18, 20, 22) at least in a form-fitting manner in a direction transverse to a longitudinal direction (42).

\* \* \* \* \*